(12) United States Patent
Kim et al.

(10) Patent No.: US 7,424,214 B2
(45) Date of Patent: Sep. 9, 2008

(54) PUSH-PULL TYPE CAMERA MODULE FOR PORTABLE WIRELESS TERMINAL

(75) Inventors: Han-Sik Kim, Sungnam-si (KR); Jong-Hwan Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 455 days.

(21) Appl. No.: 11/295,937

(22) Filed: Dec. 7, 2005

(65) Prior Publication Data

US 2006/0124746 A1      Jun. 15, 2006

(30) Foreign Application Priority Data

Dec. 11, 2004   (KR) ..................... 10-2004-0104548

(51) Int. Cl.
  *G03B 17/00* (2006.01)
  *G03B 17/48* (2006.01)
  *G03B 19/00* (2006.01)
  *G03B 29/00* (2006.01)
  *G03B 11/04* (2006.01)

(52) U.S. Cl. .................. 396/72; 396/429; 396/534; 359/611; 359/612; 348/14.02; 348/335; 455/575.3

(58) Field of Classification Search .............. 396/72, 396/429, 534; 359/611, 612; 348/335, 14.01, 348/14.02; 455/556.1, 575.3, 569.1
See application file for complete search history.

(56) References Cited

U.S. PATENT DOCUMENTS

| | | | |
|---|---|---|---|
| 6,243,540 B1 * | 6/2001 | Kume et al. | 396/534 |
| 2005/0200740 A1 * | 9/2005 | Kim et al. | 348/335 |
| 2007/0009247 A1 * | 1/2007 | Maeda et al. | 396/72 |

FOREIGN PATENT DOCUMENTS

| | | |
|---|---|---|
| KR | 2004/0050414 | 6/2004 |
| KR | 2004/0090587 | 10/2004 |
| KR | 2004/0093913 | 11/2004 |

* cited by examiner

*Primary Examiner*—Melissa Jan Koval
(74) *Attorney, Agent, or Firm*—The Farrell Law Firm, PC (57) ABSTRACT

A push-pull type camera module for a portable wireless terminal in which a hollow outer lens barrel is installed in the portable wireless terminal, a push-pull switch is installed in the outer barrel, an inner barrel is installed in the outer barrel, the inner barrel extending from or retracting to the outer barrel by the push-pull switch, a lens assembly is exposed at an outer surface of the inner barrel, the lens assembly taking a picture when the inner barrel is extended, a first switching module detects the extension and retraction of the inner barrel, and a second switching module detects rotation of the extended inner barrel.

20 Claims, 11 Drawing Sheets

PUSH-PULL TYPE CAMERA MODULE FOR PORTABLE WIRELESS TERMINAL

PRIORITY

This application claims priority under 35 U.S.C. § 119 to an application entitled "Push-Pull Type Camera Module For Portable Wireless Terminal" filed in the Korean Intellectual Property Office on Dec. 11, 2004 and assigned Ser. No. 2004-104548, the contents of which are herein incorporated by reference.

BACKGROUND OF THE INVENTION

1. Field of the Invention

The present invention relates to a push-pull type camera module for a portable wireless terminal which is extendable from the portable wireless terminal for taking pictures, and more particularly, to a push-pull type camera module for a portable wireless terminal, which provides a self-starting camera mode upon the extension of a lens barrel and an automatic picture flip-flopping when the lens barrel is rotated up to a predetermined angle.

2. Background of the Prior Art

With the development of the electronic and communication industries, portable wireless terminals are becoming common and being more advanced so as to have compact, light-weight, and multi-functional features to satisfy consumer demand. To that end, various peripheral devices are being developed and advanced for the portable wireless terminals. For example, the most recent portable wireless terminals are provided with a camera module, rotatably installed at a predetermined location for taking pictures, and a MP3 player for playing music files. Therefore, the recent portable wireless terminals are improved over the old portable wireless terminals which provided only simple call functions.

The camera module is embedded in various types of portable wireless terminals such as the bar type, slide type, and folder type portable wireless terminals. In the bar type and slide type portable wireless terminals, the camera module is rotatably installed at an upper portion of the terminal or an upper portion of a slide body, such that the user can easily take pictures of a front target object, as well as taking self-portraits. In the folder type portable wireless terminals, the camera module is installed at the back of a folder, rotatably coupled with a main body, or it is rotatably installed at a hinge module that is mounted in the folder type portable wireless terminal to provide the rotating motion of the folder. Though the camera module installed at the back of the folder is not suitable for the user to take self-portraits, the camera at the hinge module is suitable for the user to take pictures of the front target object as well as self-portraits because it can be rotated up to about 180°.

As described above, the camera modules of the various types of portable wireless terminals are exposed to take pictures of external objects. However, the exposed camera may be easily damaged by impact. Also, foreign substances may easily build up on the lens of the camera module, thereby causing image degradation, and requiring frequent cleaning and replacement of the lens.

To eliminate the drawbacks, a push-pull type camera module capable of extending and retracting motion is introduced to extend the camera module only when taking pictures. The push-pull type camera module can be constructed by employing a structure of a conventional push-pull type switch. In the folder type portable wireless terminal, the push-pull type camera module can be installed at a position where a hinge arm is installed beside a hinge module. The push-pull type camera of the folder type portable wireless terminal includes an outer barrel structured like the hinge arm and an inner barrel in the outer barrel. The inner barrel is capable of extending from the outer barrel in an axial direction. The inner barrel includes a lens assembly at an outside surface. The push-pull type switch is installed between the external and inner barrels, such that when pressed once the inner barrel can be fully extended from the outer barrel to expose the lens assembly. The extended inner barrel can be rotated up to a predetermined angle, such that the user can easily take pictures of a front target object as well as self-portraits. When the camera module is not used, the user can retract the inner barrel into the outer barrel by pressing the inner barrel once more. The push-pull type switch locks the retracted inner barrel in the outer barrel by hooking the inner barrel. Therefore, the extending and retracting structure of the push-pull type camera module can eliminate the above-mentioned drawbacks of other types of camera modules.

However, the push-pull type camera module, as well as other types of the camera modules have disadvantages in that the user has to manipulate the keypad assembly of the terminal to turn on the camera module. The user also has to manipulate the keypad assembly to flip a preview picture when the camera module is rotated more than a predetermined angle.

SUMMARY OF THE INVENTION

The present invention provides a push-pull type camera module for a portable wireless terminal, in which a camera mode is automatically turned on when the camera module is extended.

Also, the present invention provides a push-pull type camera module for a portable wireless terminal, in which a preview picture is automatically vertically flipped when the camera module is extended and rotated by a predetermined angle.

Further, the present invention provides a push-pull type camera module for a portable wireless terminal, in which a mechanical switching device is used to extend and retract the push-pull type camera module, and a camera mode is turned on and a preview picture is vertically flipping automatically through the operation of the switching device.

Further, the present invention provides a push-pull type camera module for a portable wireless terminal, in which a camera mode is turned on and a preview picture is vertically flipped automatically through the extending, rotating, and retracting motions of the push-pull type camera, thereby increasing the user's convenience.

According to an aspect of the present invention, there is provided a push-pull type camera module for a portable wireless terminal, the push-pull type camera module includes a hollow outer lens barrel installed at a predetermined portion of the portable wireless terminal; a push-pull switch installed in the outer barrel; an inner barrel installed in the outer barrel, the inner barrel being capable of extending and retracting from and to the outer barrel by a predetermined length by means of the push-pull switch; a lens assembly installed to be exposed at an outer surface of the inner barrel, the lens assembly being capable of taking a picture when the inner barrel is extended; a first switching module installed at a predetermined position to detect the extension and retraction of the inner barrel; and a second switching module installed at a predetermined position to detect rotation of the extended inner barrel.

The first and second switching modules may be installed in positions where the switching modules selectively make contact with the inner barrel during the extending and retracting movement of the inner barrel. The first switching module may be used to automatically turn on a camera mode when the inner barrel is extended. The second switching module may be used to automatically vertically flip a preview picture when the extended inner barrel is rotated a predetermined angle.

The first and second switching modules may be well-known tact-switches. The first and second switching modules may respectively include protruding first and second actuators that are selectively pressed during the movement of the inner barrel to toggle between on and off states, thereby enabling a controller of the portable wireless terminal to automatically turn on a camera mode and flip the preview picture.

The first and second switching modules may be Surface Mounted Device (SMD) type tact switches mounted on a mainboard of the portable wireless terminal. The first and second switching modules may include protruding first and second actuators that selectively come into contact with the inner barrel.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. A detailed description of well-known features will be omitted for conciseness.

A folder/slide type terminal with a folder and a slide body that are separately coupled to a main body is illustrated to describe the present invention. However, the present invention is not limited to the illustrated terminal. The present invention can be applied to various kinds of terminals with a push-pull type camera module, such as a folder type, a slide type, and a bar type portable wireless terminal.

Figure 1:
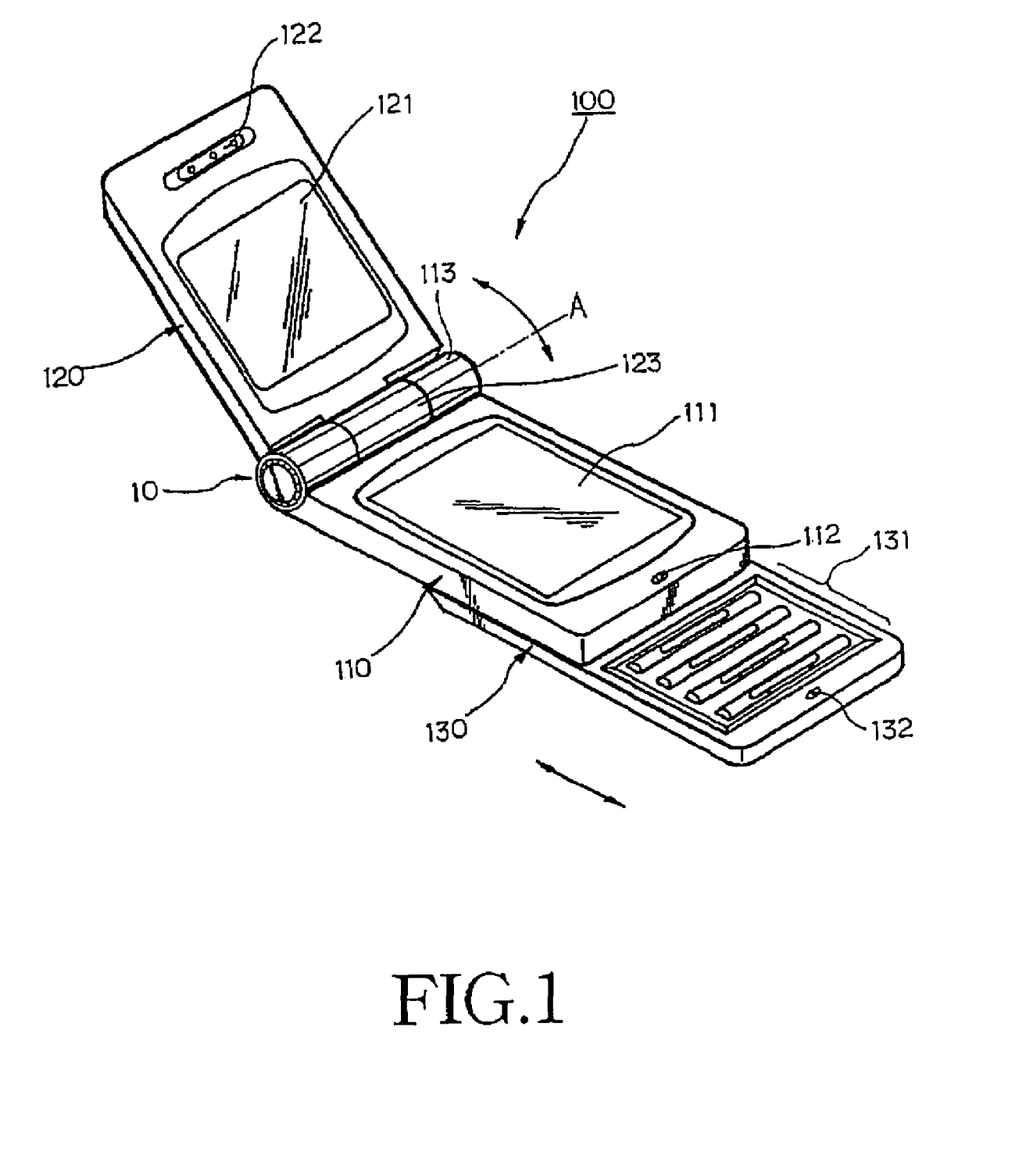
FIG. 1 is a perspective view of a portable wireless terminal according to the present invention.
Figure 2:
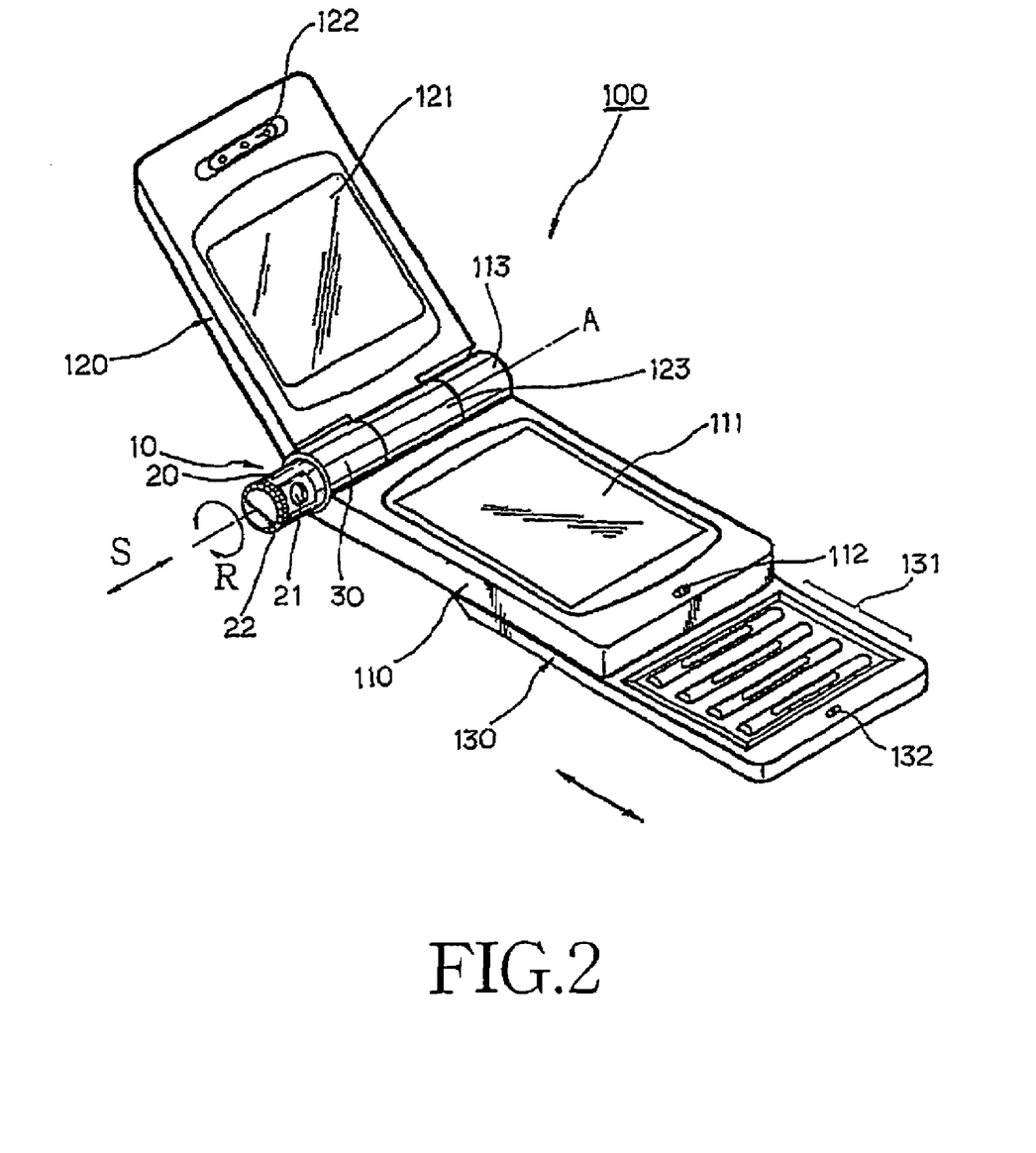
FIG. 2 is a perspective view of a portable wireless terminal when a push-pull type camera module is extended according to the present invention.

FIG. 1 is a perspective view of a portable wireless terminal according to the present invention, and FIG. 2 is a perspective view of a portable wireless terminal when a push-pull type camera module is extended according to the present invention.

Referring to FIGS. 1 and 2, a portable wireless terminal 100 includes a main body 110, a folder 120 rotatably installed at an upper portion of the main body 110, and a slide body 130 slidably installed at a bottom of the main body 110. The folder 120 is capable of rotating within a predetermined angle range about a hinge axis (A), and the slide body 130 is capable of sliding within a predetermined range in length direction of the portable wireless terminal 100.

The main body 110 includes a wide Liquid Crystal Display (LCD) module 111 and a microphone 112 above the LCD module 111. The LCD module 111 may be a touch screen type LCD module for the convenience of the user. The folder 120 may include another LCD module 121. Also, the folder 120 includes an earpiece 122 above the LCD module 121 for the user to receive voice. The slide body 130 includes a keypad assembly 131 with a plurality of key buttons at a top surface appearing when opened. The keypad assembly 131 may be a 3×4 keypad assembly. The slide body 130 may include another microphone 132 above the keypad assembly 131. The microphones 112 and 132 may be operated in association with each other, and either of the microphones 112 and 131 can be omitted.

The folder 120 can be opened at a predetermined angle to the main body 110 by a hinge module. For the opening of the folder 120, the folder 120 may include a center hinge arm 123 formed in one piece with a case frame thereof to accommodate the hinge module, and the main body 110 may include side hinge arm 113 to which the hinge module is coupled.

A push-pull type camera module 10 of the present invention is installed beside the center hinge arm 123. That is, the push-pull type camera module 10 is installed at the opposing side of center hinge arm 123 from the hinge arm 113. The push-pull type camera module 10 includes an outer barrel 30 aligned with the hinge axis (A) and an inner barrel 20. The outer barrel 30 accommodates the inner barrel 20 and also serves as a side hinge arm together with the opposing side hinge arm 113.

The inner barrel 20 includes an exposed lens assembly 21. The lens assembly 21 does not protrude from the outer surface of the inner barrel 20 allowing the inner lens barrel 20 to extend and retract from and to the outer barrel 30 without interference. The lens assembly 21 is moved in the directions of arrow (S) by a well-known push-pull switch device. That is, the lens assembly 21 extends outwardly from the outer barrel 30 when the inner barrel 20 is pressed once, and the lens assembly 21 retracts inwardly into the outer barrel 30 when the inner barrel 20 is pressed again. Also, the inner barrel 20 is capable of rotating in the directions of arrow (R) when extended outwardly from the outer barrel 30. For easier rotation of the extended inner barrel 20, the inner barrel 20 may be formed with a concave and convex portion (knob portion) at a leading end. The user of the portable wireless terminal 100 can take self-portraits by pointing the extended lens assembly 21 in the direction shown in FIG. 2. Also, the user can take pictures of a target object or person in front of the user by rotating the extended inner barrel 20 to point the lens assembly 21 toward the target front object or person. When the extended inner barrel 20 is rotated more than a predetermined angle, a preview picture on the LCD module 121 or 111 of the portable wireless terminal 100 is automatically vertically flipped to provide the preview picture in a non-inverted orientation.

Figure 3:
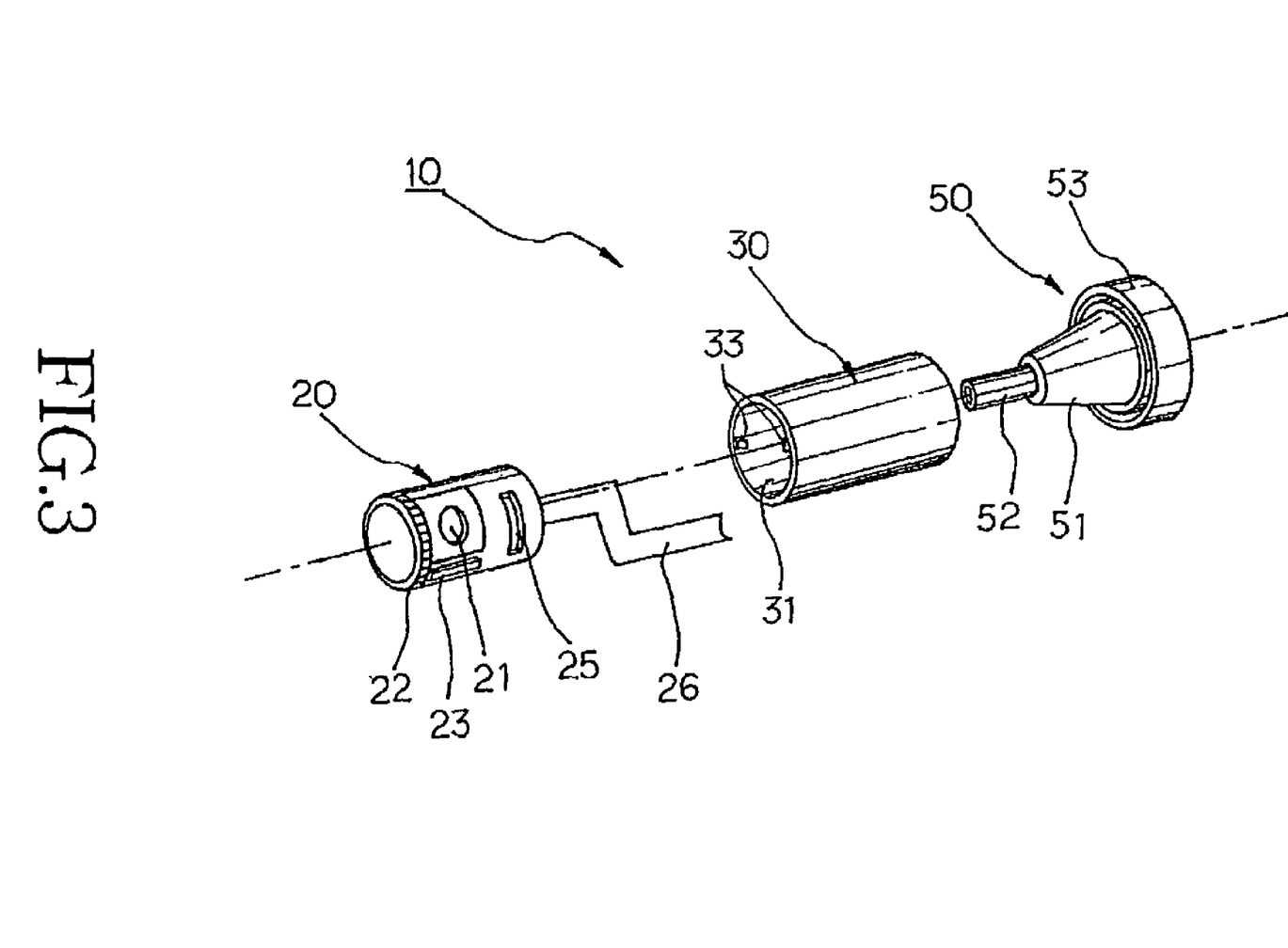
FIG. 3 is an exploded perspective view of a camera module according to the present invention.

FIG. 3 is an exploded perspective view of a camera module according to the present invention.

Referring to FIG. 3, the push-pull type camera module 10 includes the hollow outer barrel 30, the inner barrel 20, and a dummy module 50. The extendable inner barrel 20 is installed in the outer barrel 30 by inserting it from one side of the outer barrel 30 (when assembled). The dummy module 50 is to be installed at the other side of the outer barrel 30.

The outer barrel 30 may include at least one fixing portion for fixing the outer barrel 30 to the portable wireless terminal 100. Fasteners such as a screw may be applied to the fixing portion and a case frame of the terminal 100 to fix the outer barrel 30 to the terminal 100.

The inner barrel 20 includes the exposed lens assembly 21. The exposed surface of the lens assembly 21 is lower than the outer surface of the inner barrel 20 or at least flush with the outer surface of the inner barrel 20, such that the inner barrel 20 can smoothly move in the outer barrel 30. Also, the lens assembly 21 may be electrically connected with a main board of the portable wireless terminal 100 through a Flexible Printed Circuit (FPC) 26. The FPC 26 may be connected between the lens assembly and the mainboard through the inner barrel 20 and the outer barrel 30.

Since the inner barrel 20 does not need to rotate more than a certain angle and over-rotation of the inner barrel 20 causes breakage of the FPC 26, the inner barrel 20 is provided with an over-rotation limiter. For example, if a reference position of the lens assembly 21 is set to 0° when the lens assembly 21 points the user, it may be sufficient that the lens assembly 21 rotates within an range of 0° to about 180°. The over-rotation limiter may include a protrusion 23 formed on an outer surface of the inner barrel 20 and stoppers 33 arranged on inner surfaces of the outer barrel 30 at a predetermined angle therebetween. For example, when the lens assembly 21 is located at the reference position one of the stoppers 33 may be abutted against one side of the protrusion 23 to allow the rotation of the inner barrel 20 only in one direction, and after the inner lens barrel rotates an angle of about 180° the other of the stopper 33 may be abutted against the other side of the protrusion 33 to prevent further rotation of the inner barrel 20.

The dummy module 50 includes a cap 53 covering one side of the outer barrel 30 and a push-pull switch device 52 installed inside the cap 53. The push-pull switch device 51 is a well-known device providing extending and retracting motions upon pressing. The push-pull switch device 51 includes a moving shaft 52 fixed to one end of the inner barrel 20, such that when the inner barrel is pressed once the moving shaft 52 pushes the inner barrel 20 outwardly from the outer barrel 30 and when the inner barrel 20 is pressed again the moving shaft 52 holds the inner barrel 20 in the outer barrel 30.

Also, the inner barrel 20 defines a recess 25 at an outer surface in a circumferential direction to turn a switching module on and off. The location of the recess 25 shown in FIG. 3 is not critical. The location of the recess 25 may be changed depending on the operation of flipping the preview picture.

Figure 4:
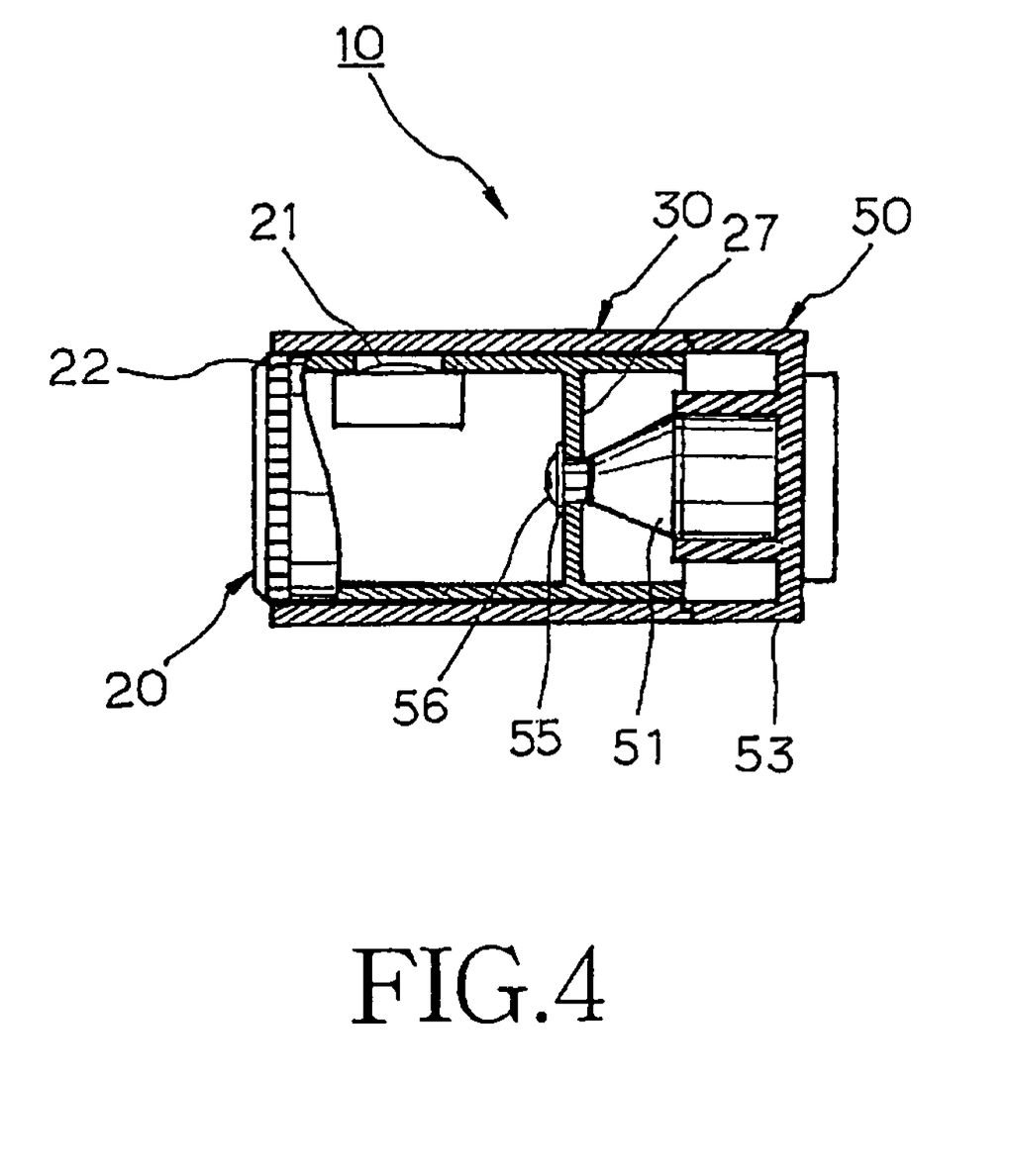
FIG. 4 is a side cut-away view of an assembled camera module depicted in FIG. 3.
Figure 5:
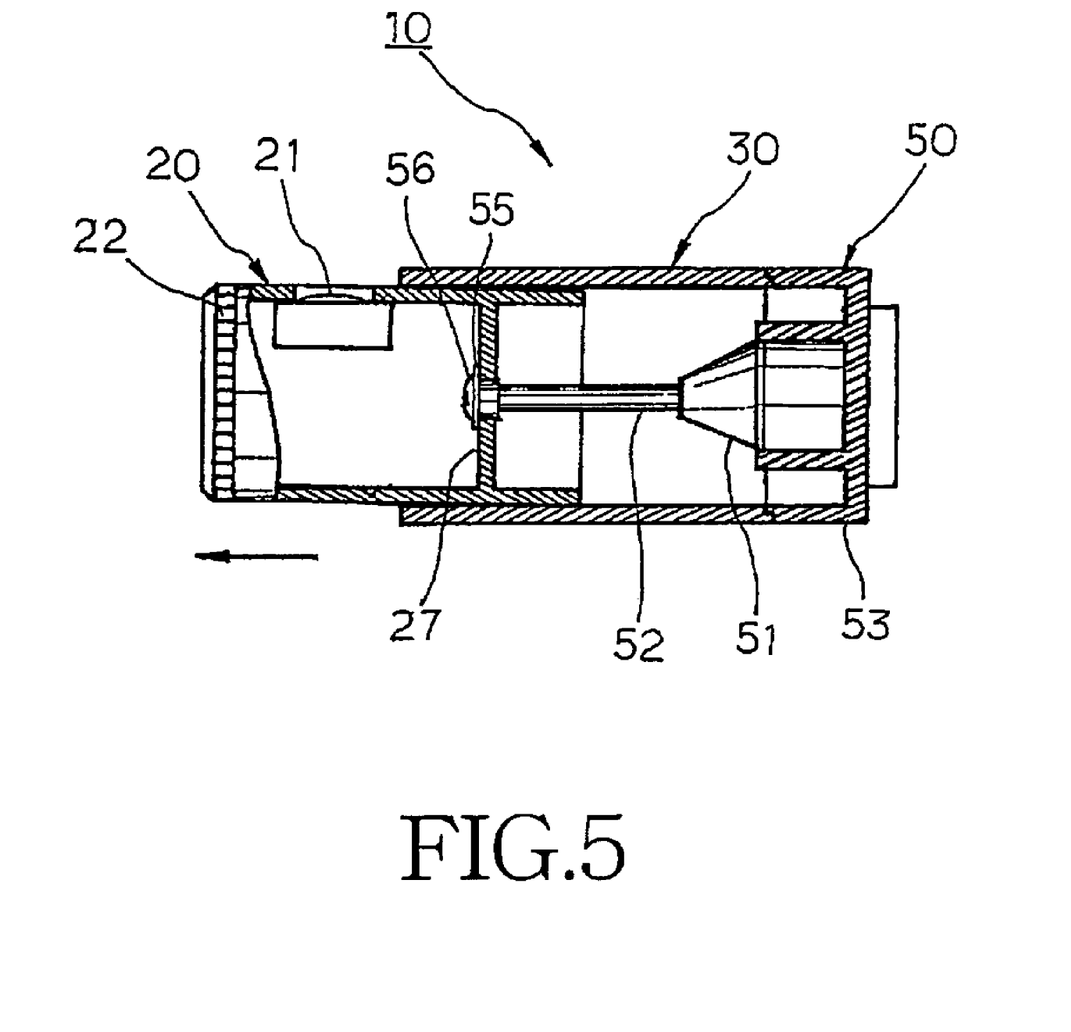
FIG. 5 is a side cut-away view of an assembled camera module when an inner barrel is extended according to the present invention.

FIG. 4 is a side cut-away view of an assembled camera module depicted in FIG. 3. FIG. 5 is a side cut-away view of an assembled camera module when an inner barrel is extended according to the present invention.

Referring to FIGS. 4 and 5, the inner barrel 20 is extendable in the outer barrel 30. One end of the inner barrel 20 is fixed to one end of the moving shaft 52 of the push-pull switch device 51 installed in the dummy module 50. That is, the inner barrel 20 includes a barrier rib 27 across the inside of it. The one end of the moving shaft 52 is fixed to the barrier rib 27 using a screw 56. An o-ring 55 may be disposed between the moving shaft 52 and the screw 56 to prevent breakage around the screw 56 owing to frequent moving of the inner barrel 20.

When pressed toward the dummy module 50, the inner barrel 20 extends from the outer barrel 30 or retracts into the inner barrel 30. That is, when pressed once the inner barrel 20 extends from the outer barrel 30 as shown in FIG. 5, and when pressed again in the same direction the inner barrel 20 retracts to the outer barrel 30 as shown in FIG. 4. The push-pull switch device 51 enables the extending and retracting motions of the inner barrel 20. When the inner barrel 20 is extended, the lens assembly 21 of the inner barrel 20 will be sufficiently exposed from the outer barrel 30 to take a picture.

Figure 6:
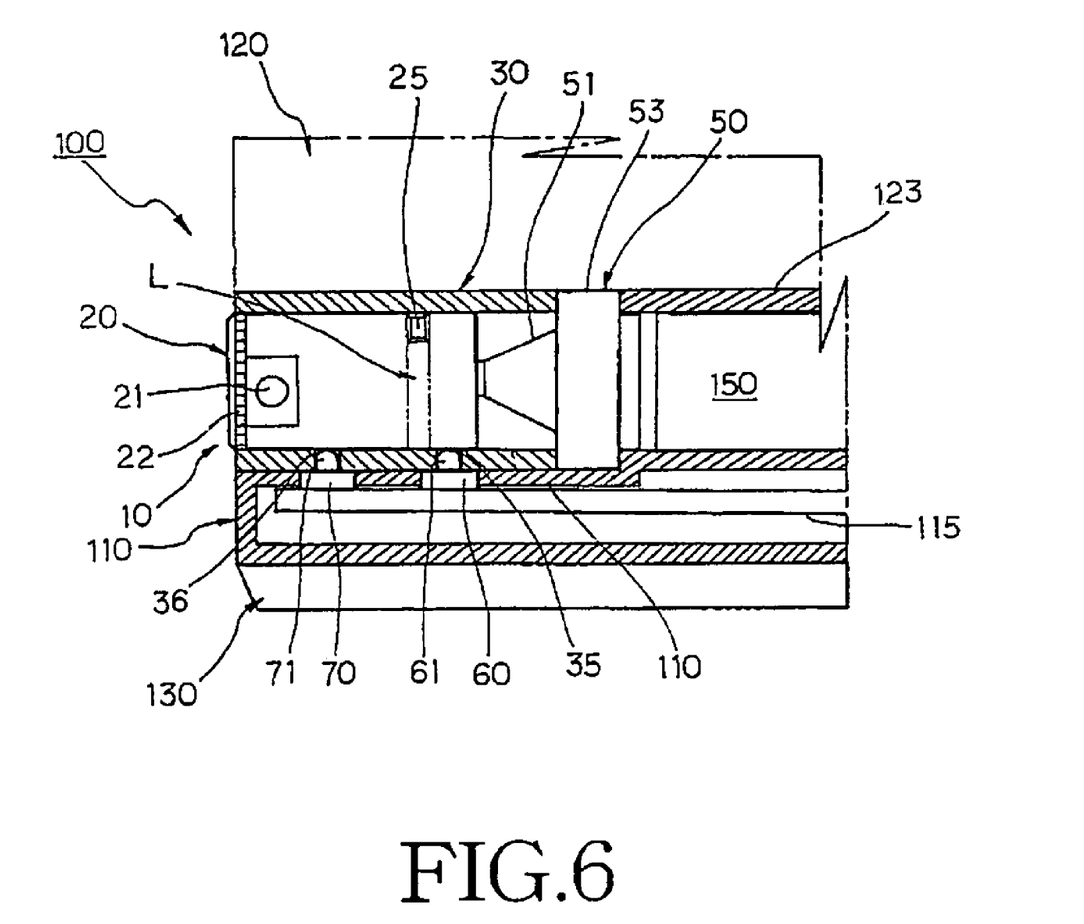
FIG. 6 is a partial cut-away view showing an installation of a camera module in a portable wireless terminal according to the present invention.
Figure 7:
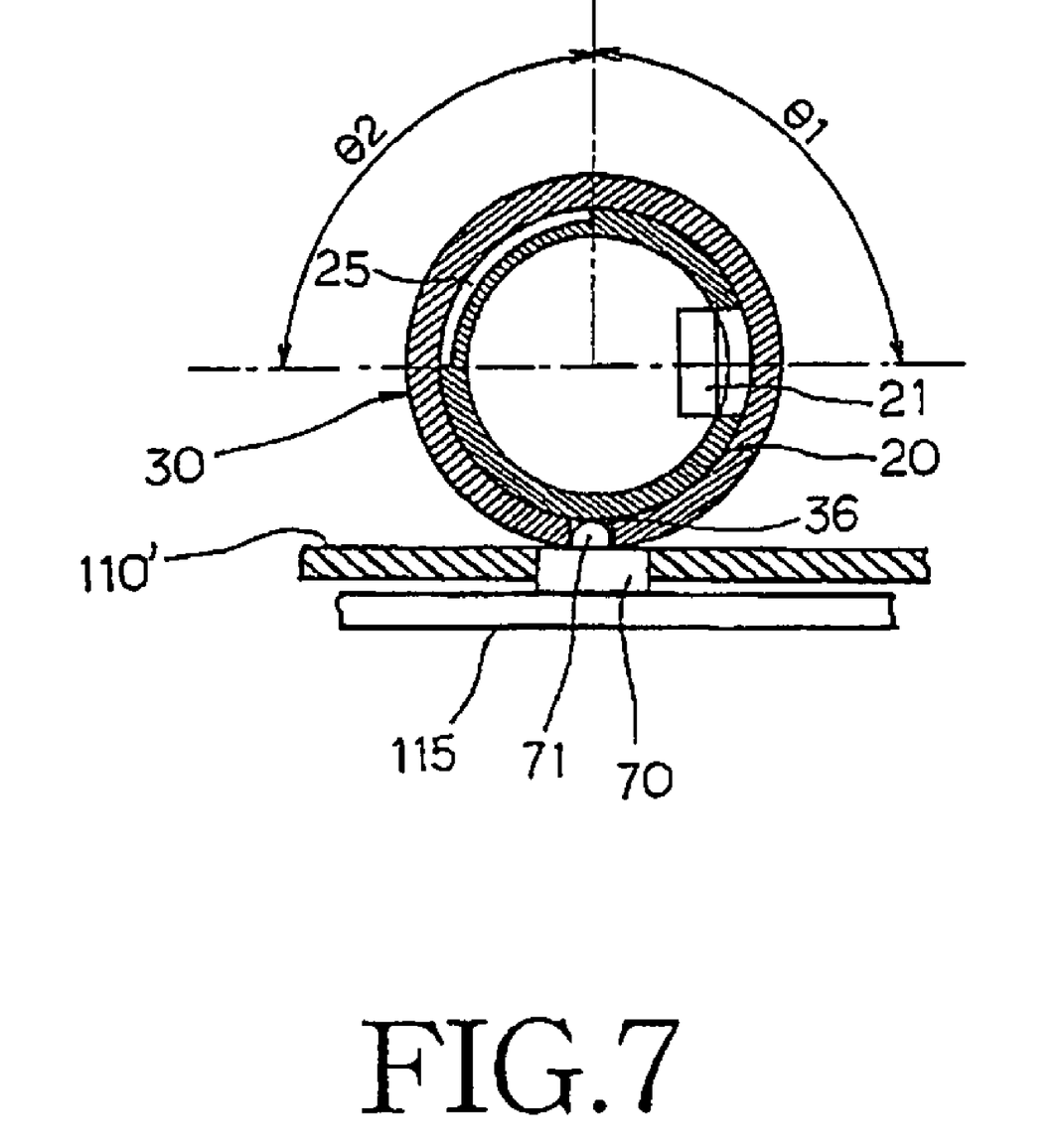
FIG. 7 is a schematic cross sectional view of FIG. 6.

FIG. 6 is a partial cut-away view showing an installation of a camera module in a portable wireless terminal according to the present invention, and FIG. 7 is a schematic cross sectional view of FIG. 6.

Referring to FIGS. 6 and 7, the push-pull type camera module 10 is installed parallel with the hinge axis (A) (not shown) and adjacent to the hinge module 150 connecting the folder 120 and the main body 10. The hinge module 150 is installed in the center hinge arm 123 of the folder 120, and the push-pull type camera module 10 is installed beside the hinge module 150.

The main body 110 includes a first switching module 60 and a second switching module 70 that toggle between on state and off state in response to the movement of the inner barrel 20. The first and second switching modules 60 and 70 may be Surface Mount Device (SMD) type switching modules mounted on a mainboard 115 of the main body 110. The first and second switching modules 60 and 70 include protruding first and second actuators 61 and 71 at their tops, respectively. The inner barrel 20 as it moves selectively presses the first and second actuators 61 and 71, such that the first and second actuators 61 and 71 can be toggled between on and off states.

The first and second switching modules 60 and 70 may be mounted on the mainboard 115 such that the first and second actuators 61 and 71 can protrude from a case frame 110' of the main body 110 toward the retracted inner barrel 20. That is, the protruding actuators 61 and 71 are respectively inserted into through holes 35 and 36 defined in the outer barrel 30 to come into contact with the retracted inner barrel 20. The first and second switching modules 60 and 70 are spaced apart from each other. The first switching module 60 detects the extending and retracting motions of the inner barrel 20. A controller of the portable wireless terminal 100 automatically turns on a camera mode according the detection operation of the first switching module 60. The second switching module 70 detects the rotation of the extended inner barrel 20. The controller of the portable wireless terminal 100 automatically vertically flips a preview picture according the detection operation of the second switching module 70.

The first switching module 60 is located such that it maintains an on state when the first actuator 61 is pressed by the retracted inner barrel 20 and changes to an off state when the pressed first actuator 61 is released as the inner barrel 20 extends outwardly from the outer barrel 30.

The second switching module 70 is mounted on a predetermined position of the mainboard such that the second actuator 71 is selectively accommodated in the recess 25 only when the inner barrel 20 is rotated after being extended. That is, the recess 25 is defined at an outer surface of the inner barrel 20 in a circumferential direction (refer to "L" in FIG. 6)

with a predetermined length and a predetermined width. Therefore, the second actuator 71 comes into alignment with the recess 25 when the inner barrel 20 is extended, but it abuts against the outer surface of the inner barrel 20 without alignment with the recess 25 when the inner barrel 20 is retracted. Also, the recess 25 is located such that it mates with the second actuator 71 when the extended inner barrel 20 is rotated to a position at which the camera module. 10 has to flip the preview picture vertically. Ends of the first and second actuators 61 and 71 are rounded for smooth contact with surfaces such as the recess 25 and the outer surface of the inner barrel 20 and for smooth change between the on and off states.

The first and second switching modules 60 and 70 may be well-known tact switches. Alternatively, other types of well-known switches with an actuator, such as contact point switches (capable of toggling between on and off states by pressing), may be used for the first and second switching modules 60 and 70.

An operation of the push-pull type camera module 10 will now be described with reference to FIGS. 6 to 11 and Table 1 below. Table 1 shows operating states of the push-pull type camera module 10 according to the extended/retracted states and the rotational angle of the extended inner barrel 20.

TABLE 1

| Inner Barrel Position | First Switching Module | Second Switching Module | Camera Mode | Picture Flipping |
|---|---|---|---|---|
| Retracted (0°~180°) | ON | ON | OFF | OFF |
| Extended (0°~90°) | OFF | ON | ON | NO |
| Extended (90°~180°) | OFF | OFF | ON | YES |

When the push-pull type camera module 10 is not being used, the inner barrel 20 rests at the retracted position in the outer barrel 30 as shown in FIG. 6. In this position, the inner barrel 20 presses both the first and second actuators 61 and 71, and accordingly the first and second switching modules 60 and 70 are all in on-states as shown in the second row of Table 1. The controller of the portable wireless terminal 100 keeps the camera mode in off state while the first and second switching modules 60 and 70 are all in the on-states.

Figure 8:
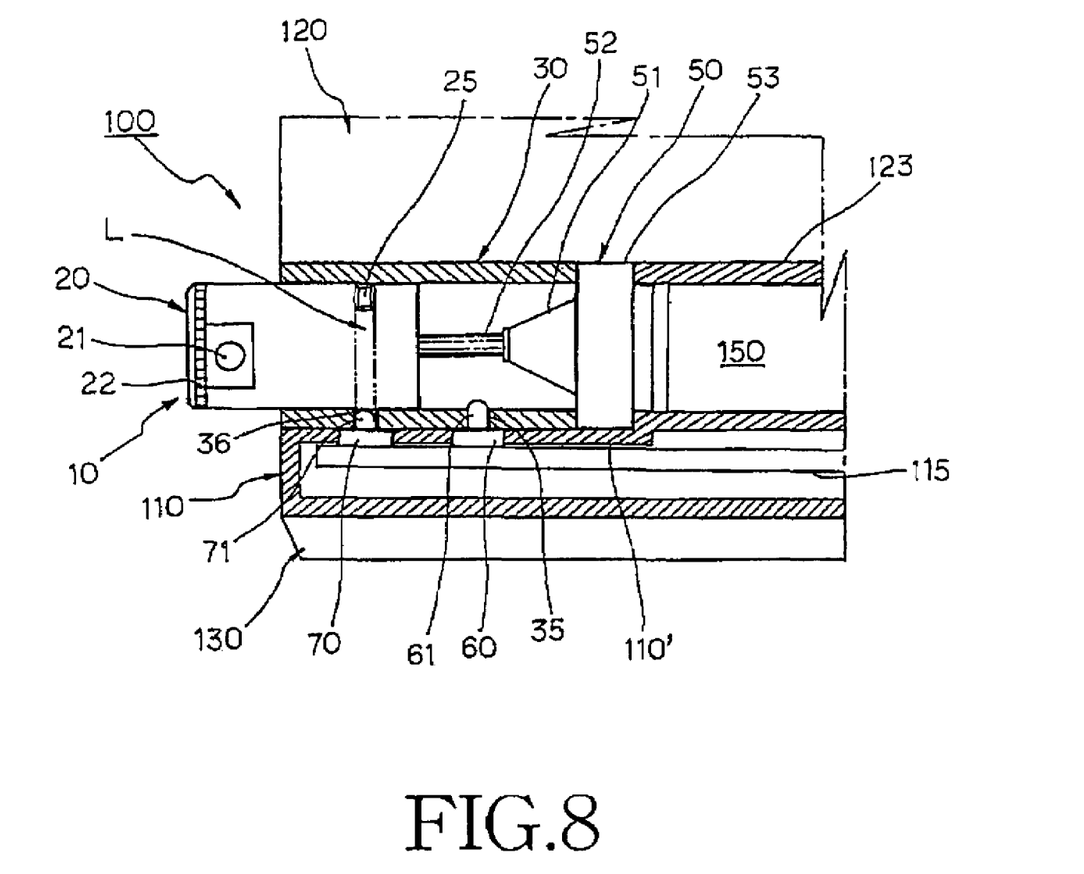
FIG. 8 is a partial cut-away view showing an extended position of a camera module in a portable wireless terminal according to the present invention.

FIG. 8 is a partial cut-away view showing an extended position of a camera module in a portable wireless terminal according to the present invention.

Referring to FIG. 8, the inner barrel 20 is extended from the outer barrel 30 by the push-pull switch device 51, and the lens assembly 21 of the inner barrel 20 is pointed to the terminal user. In this extended position in which the inner barrel 20 is still partially inserted in the outer barrel 30. The first actuator 61 is released to change the first switching module 60 to off state. Though the second actuator 71 is aligned with the recess 25, it is not accommodated in the recess 25 because the inner barrel 20 has not been rotated at least 90° to allow the second actuator 71 to mate with the recess 25. Consequently, the second switch module 70 is still in the on state as shown in third row of Table 1. Accordingly, the controller of the portable wireless terminal 100 turns on the camera mode upon the turn-off of the first switching module 60, but does not flip a preview picture vertically because the lens assembly 21 is pointed to the terminal user so the second switching module 70 is still in the on state.

Figure 9:
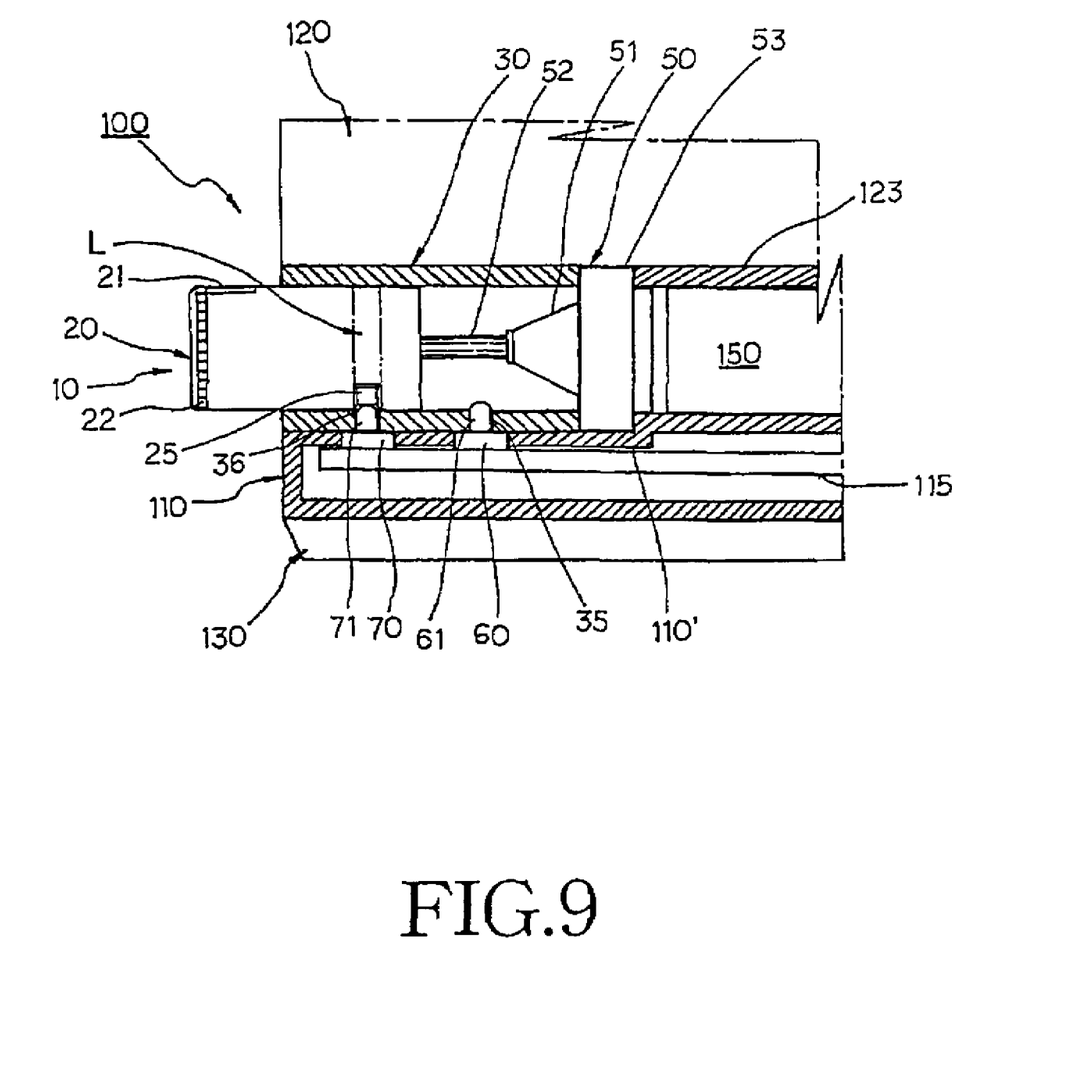
FIG. 9 is a partial cut-away view showing a camera module that is rotated more than 90° after being extended from a portable wireless terminal according to the present invention.
Figure 10:
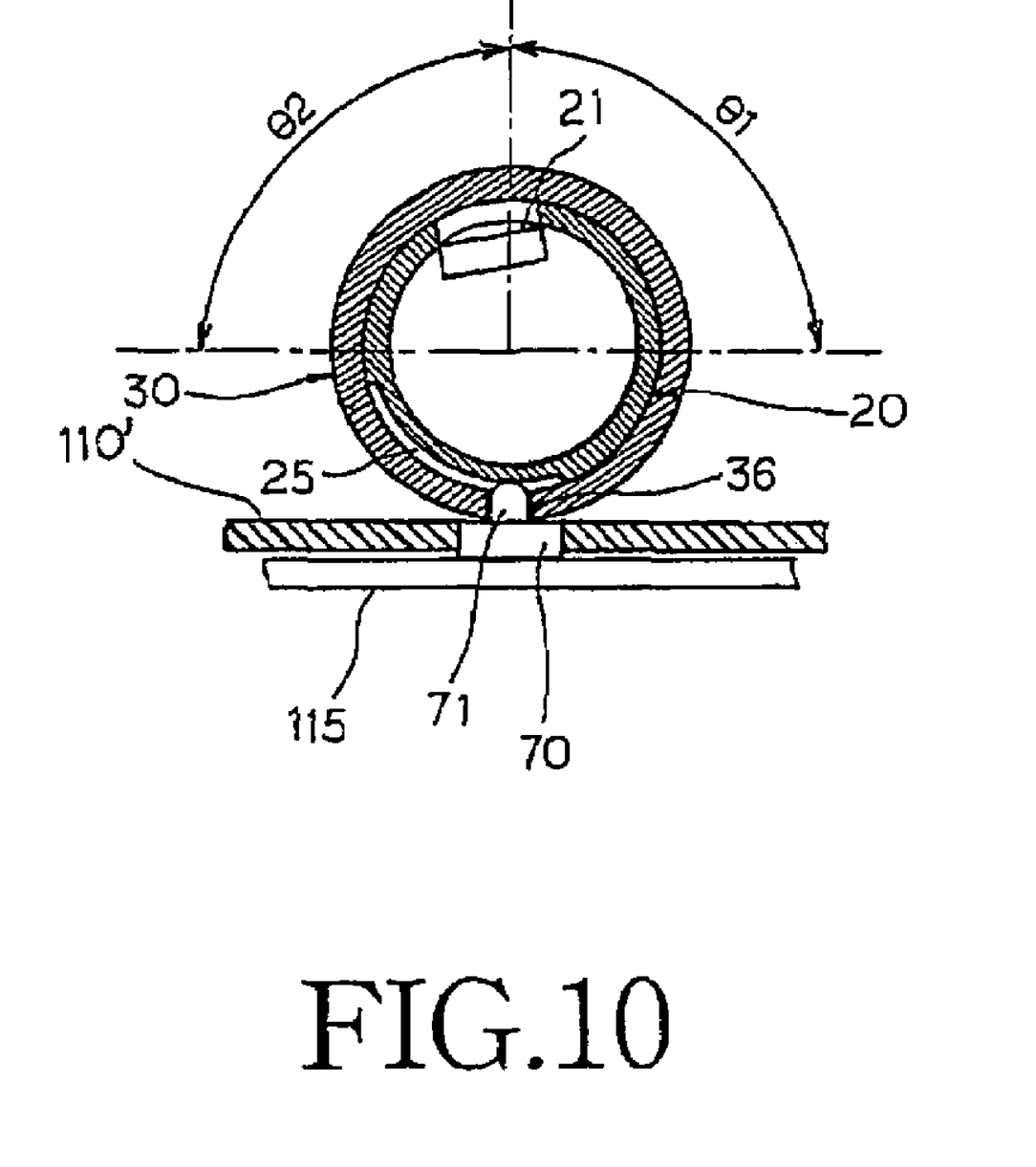
FIG. 10 is a schematic cross sectional view of FIG. 9.

FIG. 9 is a partial cut-away view showing a camera module that is rotated more than 90° after being extended from a portable wireless terminal according to the present invention, and FIG. 10 is a schematic cross sectional view of FIG. 9.

Referring to FIGS. 9 and 10, the extended inner barrel 20 is rotated more than 90° from the original position shown in FIG. 8 to point the lens assembly 21 toward an object in front of the terminal user. When the inner barrel 20 is rotated to an angle of θ1, the second actuator 71 springs out into the recess 25 to turn off the second switching module 70. Accordingly, the controller of the portable wireless terminal 100 flips the preview picture vertically to provide a non-inverted normal preview picture to the terminal user. In summary, when the first switching module 60 is turned off the controller of the portable wireless terminal 100 automatically turns on the camera mode, and when the second switching module 70 is also turned off the controller automatically vertically flips the preview picture to provided a properly oriented review picture to the terminal user.

The inner barrel 20 of the push-pull type camera module 10 may be rotated in a range of 0° to 180°, and the angle θ1 may be 90°. Accordingly, the arc of the recess 25 may correspond with the angle θ2.

Figure 11:
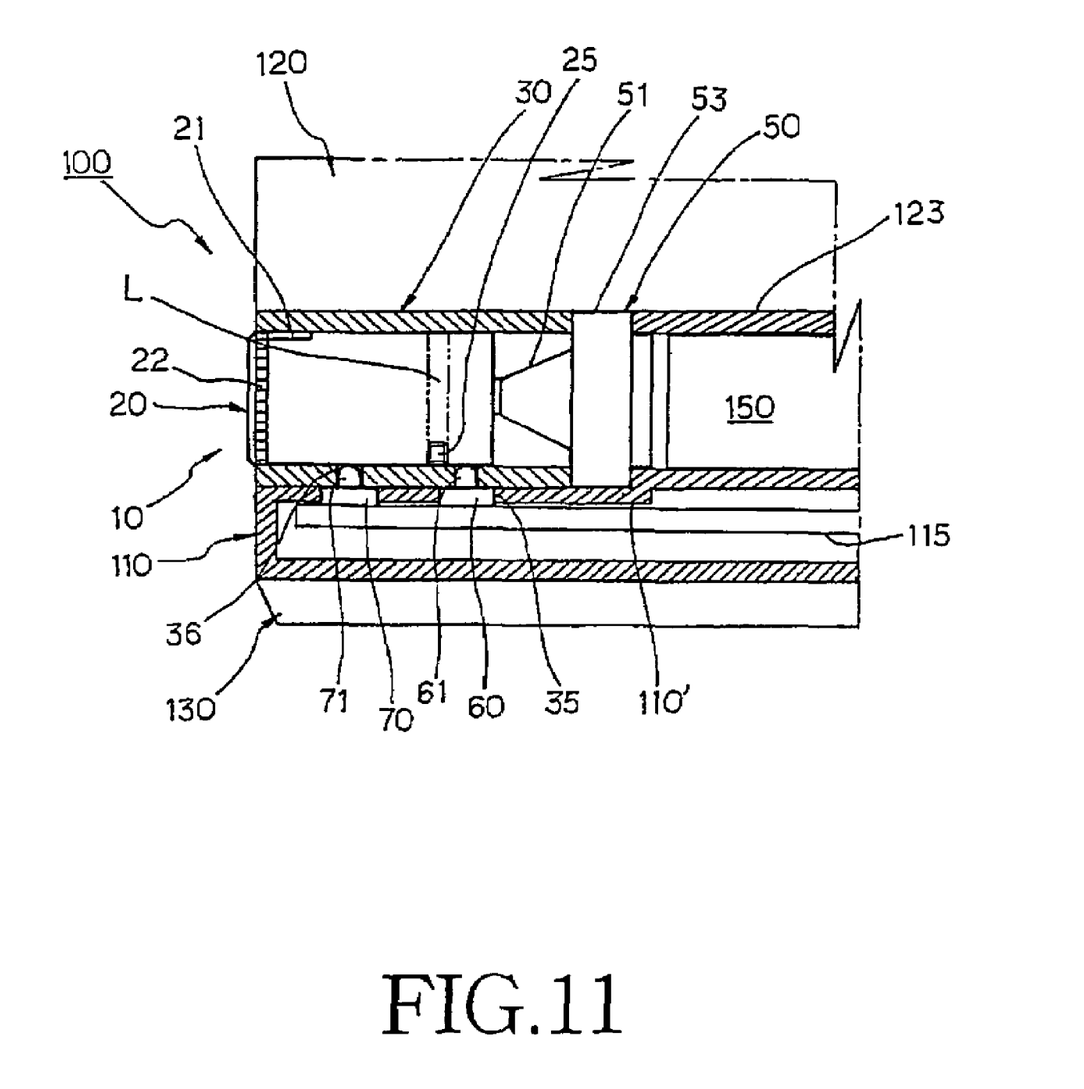
FIG. 11 is a partial cut-away view showing a camera module that is retracted into a portable wireless terminal from a position depicted in FIG. 9.

FIG. 11 is a partial cut-away view showing a camera module that is retracted to a portable wireless terminal from a position depicted in FIG. 9.

When the inner barrel 20 is retracted into the outer barrel 30 from a position where the preview picture is flipped (second switching module is in off-state), the second actuator 71 leaves from the recess 25 and it is pressed by the outer surface of the inner barrel 20 to turn on the second switching module 70. Also, the first actuator is pressed by the back end of the inner barrel 20 to turn on the first switching module 60. Therefore, the push-pull type camera module 10 the portable wireless terminal 100 when it is not used. That is, even when the inner barrel 20 has been previously extended and the inner barrel 20 has been rotated to flip the preview picture vertically for taking a picture of a front object, all operating modes of the push-pull type camera module 10 can be automatically turned off by pressing the extended inner barrel 20 into the outer barrel 30.

As described above, the push-pull type camera module of the present invention is designed to provide the self-starting camera mode with automatic picture flipping, thereby increasing user convenience.

The foregoing embodiments are merely exemplary and are not to be construed as limiting the present invention. Many alternatives, modifications, and variations will be apparent to those of skill in the art. For example, though the recess 25 defined at the outer surface of the inner barrel 20 is used to turn on/off the second switching module 70, a projection with a predetermined length and width may be formed on the outer surface of the inner barrel 20 instead of the recess 25 to perform the same function. That is, the description of the present invention is intended to be illustrative, and not to limit the scope of the claims. It will be understood by those of ordinary skill in the art that various changes in form and details may be made in the present invention without departing from the spirit and scope of the present invention as defined by the following claims.

What is claimed is:

1. A push-pull type camera module for a portable wireless terminal, comprising:
   a hollow outer lens barrel installed at a predetermined portion of the portable wireless terminal;
   a push-pull switch installed in the outer barrel;

an inner barrel installed in the outer barrel, the inner barrel being capable of extending and retracting from and to the outer barrel by a predetermined length by means of the push-pull switch;

a lens assembly installed to be exposed at an outer surface of the inner barrel, the lens assembly being capable of taking a picture when the inner barrel is extended;

a first switching module installed at a predetermined position to detect the extension and retraction of the inner barrel; and a second switching module installed at a predetermined position to detect rotation of the extended inner barrel.

2. The push-pull type camera module of claim 1, further comprising a controller for automatically turning on a camera mode in response to a detection operation by the first switching module and automatically vertically flipping a preview picture in response to a detection operation by the second switching module in the camera mode.

3. The push-pull type camera module of claim 2, wherein the first and second switching modules are mechanical switches that are mounted on a mainboard of a main body of the portable wireless terminal, the first and second switching modules being inserted through the outer barrel to abut on outer surfaces of the inner barrel.

4. The push-pull type camera module of claim 3, wherein the first and second switching modules respectively include a first actuator and a second actuator that are inserted through the outer barrel to abut on the surfaces of the inner barrel and perform switching operations in response to the movement of the inner barrel.

5. The push-pull type camera module of claim 4, wherein the first switching module is mounted on the predetermined position of the mainboard such that when the inner barrel is retracted the first actuator is abutted on the outer surface of the inner barrel to keep an on-state of the first switching module and when the inner barrel is extended the first actuator is not abutted on the outer surface of the inner barrel to keep an off-state of the first switching module.

6. The push-pull type camera module of claim 5, wherein the inner barrel defines a recess at an outer surface in a circumferential direction with a predetermined length and a predetermined width, and the second switching module is mounted on the predetermined position of the mainboard such that the second actuator is selectively accommodated in the recess only when the extended inner barrel is rotated.

7. The push-pull type camera module of claim 6, wherein the second switching module changes to an on state or an off state when the second actuator is accommodated in the recess.

8. The push-pull type camera module of claim 7, wherein the recess mates with the second actuator when the extended inner barrel is rotated to a position at which the camera module has to flip the preview picture vertically.

9. The push-pull type camera module of claim 5, wherein the inner barrel includes a projection at an outer surface in a circumferential direction with a predetermined length and a predetermined width, and the second switching module is mounted on the predetermined position of the mainboard such that the second actuator selectively comes into contact with the projection only when the extended inner barrel is rotated.

10. The push-pull type camera module of claim 9, wherein the second switching module changes to an on state or an off state when the second actuator comes into contact with the projection.

11. The push-pull type camera module of claim 10, wherein the projection mates with the second actuator when the extended inner barrel is rotated to a position at which the camera module has to flip the preview picture vertically.

12. The push-pull type camera module of claim 3, wherein the first and second switching modules are SMD (Surface Mount Device) type tact switches mounted on the mainboard of the main body of the portable wireless terminal.

13. The push-pull type camera module of claim 4, wherein the first and second switching modules are SMD (Surface Mount Device) type tact switches mounted on the mainboard of the main body of the portable wireless terminal.

14. The push-pull type camera module of claim 5, wherein the first and second switching modules are SMD (Surface Mount Device) type tact switches mounted on the mainboard of the main body of the portable wireless terminal.

15. The push-pull type camera module of claim 6, wherein the first and second switching modules are SMD (Surface Mount Device) type tact switches mounted on the mainboard of the main body of the portable wireless terminal.

16. The push-pull type camera module of claim 7, wherein the first and second switching modules are SMD (Surface Mount Device) type tact switches mounted on the mainboard of the main body of the portable wireless terminal.

17. The push-pull type camera module of claim 13, wherein ends of the first and second actuators are rounded for smooth contact with the outer surface of the inner barrel.

18. The push-pull type camera module of claim 14, wherein ends of the first and second actuators are rounded for smooth contact with the outer surface of the inner barrel.

19. The push-pull type camera module of claim 15, wherein ends of the first and second actuators are rounded for smooth contact with the outer surface of the inner barrel.

20. The push-pull type camera module of claim 16, wherein ends of the first and second actuators are rounded for smooth contact with the outer surface of the inner barrel.

* * * * *